United States Patent
Bang et al.

(10) Patent No.: US 7,894,544 B2
(45) Date of Patent: Feb. 22, 2011

(54) APPARATUS AND METHOD FOR TRANSMITTING/RECEIVING A SIGNAL IN A MOBILE COMMUNICATION SYSTEM USING A MULTIPLE-INPUT MULTIPLE-OUTPUT SCHEME

(75) Inventors: Ji-Won Bang, Seoul (KR);
Young-Kwan Choi, Seoul (KR);
Dong-Ku Kim, Seoul (KR)

(73) Assignees: Samsung Electronics Co., Ltd (KR);
Seoul National University Industry Foundation (KR)

( * ) Notice: Subject to any disclaimer, the term of this patent is extended or adjusted under 35 U.S.C. 154(b) by 834 days.

(21) Appl. No.: 11/713,545

(22) Filed: Mar. 2, 2007

(65) Prior Publication Data
US 2007/0223622 A1    Sep. 27, 2007

(30) Foreign Application Priority Data
Mar. 3, 2006    (KR) ............ 10-2006-0020486

(51) Int. Cl.
H04L 27/00    (2006.01)
H04B 7/02    (2006.01)
H04L 1/02    (2006.01)

(52) U.S. Cl. .............. 375/295; 375/267; 375/299; 455/132

(58) Field of Classification Search .......... 375/260, 375/267, 295, 316
See application file for complete search history.

(56) References Cited

U.S. PATENT DOCUMENTS 6,865,237 B1 * 3/2005 Boariu et al. ............ 375/295
6,888,809 B1 5/2005 Foschini et al.
2004/0257978 A1 * 12/2004 Shao et al. ............ 370/208
2005/0204273 A1 * 9/2005 Jeong et al. ............ 714/801
2005/0249306 A1 * 11/2005 Chae et al. ............ 375/267
2005/0281350 A1 12/2005 Chae et al.

(Continued)

FOREIGN PATENT DOCUMENTS

KR    1020010076252    8/2001

(Continued)

OTHER PUBLICATIONS

Vahid Tarokh et al.; "Space-Time Block Codes from Orthogonal Designs"; IEEE Transactions on Information Theory; vol. 45; No. 5; Jul. 1999 pp. 1456-1467.

(Continued)

*Primary Examiner*—Shuwang Liu
*Assistant Examiner*—Gina McKie
(74) *Attorney, Agent, or Firm*—The Farrell Law Firm, P.C.

(57) ABSTRACT

In a communication system, a signal transceiver generates an upper pre-encoding symbol stream and a lower pre-encoding symbol stream by pre-encoding an upper transmission vector and a lower transmission vector according to a pre-encoding scheme when the upper and lower transmission vectors to be transmitted are input. The signal transceiver generates a space-time mapping matrix by space-time mapping the upper and lower pre-encoding symbol streams according to a space-time mapping scheme based on the number of transmit antennas to be used in the signal transceiver. The signal transceiver generates and transmits a codeword according to whether a null transmission is present in the space-time mapping matrix.

8 Claims, 2 Drawing Sheets

U.S. PATENT DOCUMENTS

2006/0153312 A1* 7/2006 Yun et al. .................. 375/267
2009/0175363 A1* 7/2009 Hottinen et al. ............. 375/260

FOREIGN PATENT DOCUMENTS

KR 1020050120244 12/2005

OTHER PUBLICATIONS

Siavash M. Alamouti; "A Simple Transmit Diversity Technique for Wireless Communications"; IEEE Journal on Select Areas in Communications; vol. 16; No. 8; Oct. 1998; pp. 1451-1458.

* cited by examiner

APPARATUS AND METHOD FOR TRANSMITTING/RECEIVING A SIGNAL IN A MOBILE COMMUNICATION SYSTEM USING A MULTIPLE-INPUT MULTIPLE-OUTPUT SCHEME

PRIORITY

This application claims priority under 35 U.S.C. §119(a) to a Korean Patent Application filed in the Korean Intellectual Property Office on Mar. 3, 2006 and assigned Serial No. 2006-20486, the entire disclosure of which is hereby incorporated by reference.

BACKGROUND OF THE INVENTION

1. Field of the Invention

The present invention generally relates to an apparatus and method for transmitting/receiving a signal in a mobile communication system, and more particularly to an apparatus and method for transmitting/receiving a signal that can reduce a peak to average power ratio (PAPR) and decoding complexity in a mobile communication system using a multiple-input multiple-output (MIMO) scheme.

2. Description of the Related Art

One of the most fundamental problems in mobile communication is to efficiently and reliably transmit data on a channel. In the next-generation multimedia mobile communication systems on which extensive research is being conducted, high-speed communication systems are required which can process and transmit various types of information such as images, wireless data, and the like beyond the initial voice-centric service. Thus, it is essential to increase system efficiency using channel coding suitable for the high-speed communication systems.

Unfortunately, errors and information loss may occur due to many factors such as multipath interference, shadowing, propagation attenuation, time variant noise, interference fading and the like in wireless channel environments of the wireless communication systems.

An actual transmitted signal may be significantly distorted due to the information loss. This distortion may be a factor degrading the overall performance of a wireless communication system. Various error control techniques according to channel characteristics are used to reduce the information loss. Among the error control techniques, one technique uses error-correcting codes.

In addition, diversity schemes are used to eliminate communication instability due to the fading effect. The diversity schemes can be classified into a time diversity scheme, a frequency diversity scheme and an antenna diversity scheme, that is, a space diversity scheme.

The antenna diversity scheme uses multiple antennas and is divided into a receive (Rx) antenna diversity scheme using multiple Rx antennas, a transmit (Tx) antenna diversity scheme using multiple Tx antennas, and a multiple-input multiple-output (MIMO) scheme using multiple Rx antennas and multiple Tx antennas.

A kind of the MIMO scheme is a space-time coding (STC) scheme. The STC scheme extends time-domain coding to a space domain and achieves a lower error rate by transmitting signals encoded in a predefined coding scheme using multiple Tx antennas.

Vahid Tarokh, et al. proposed space-time block coding (STBC) as one method of efficiently applying the antenna diversity scheme (see Vahid Tarokh, et al., "Space-Time Block Coding from Orthogonal Designs", IEEE Trans. on Info., Theory, Vol. 45, pp. 1456-1467, July 1999). The STBC scheme is an extension of the Tx antenna diversity scheme of S. M. Alamouti for two or more Tx antennas (see S. M. Alamouti, "A Simple Transmitter Diversity Technique for Wireless Communications", IEEE Journal on Selected Area in Communications, Vol. 16, pp. 1451-1458, October 1988).

Figure 1:
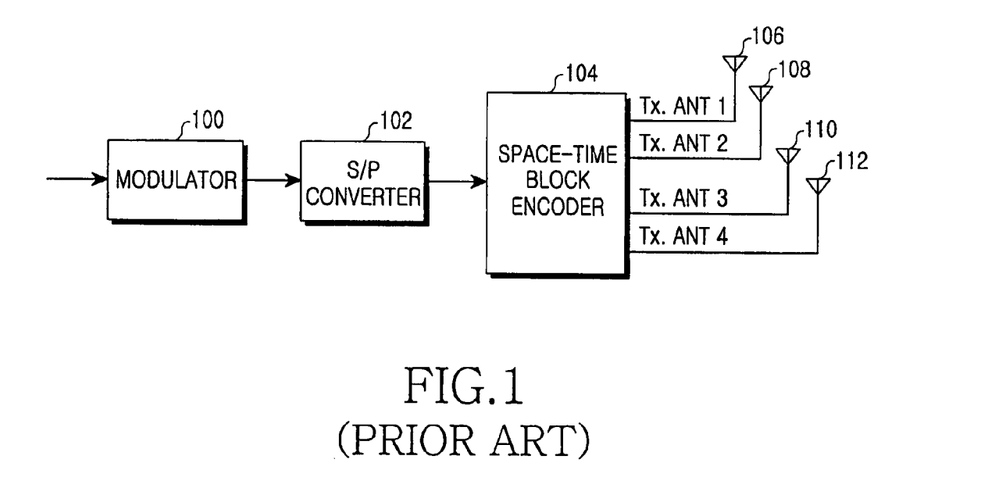
FIG. 1 illustrates a structure of a signal transmitter of a multiple-input multiple-output (MIMO) mobile communication system using space-time block coding and four transmit antennas.

FIG. 1 illustrates a structure of a signal transmitter of a MIMO mobile communication system using STBC and four Tx antennas proposed by Vahid Tarokh.

Referring to FIG. 1, the signal transmitter includes a modulator 100, a serial-to-parallel (S/P) converter 102, a space-time block encoder 104, and four Tx antennas, that is, a first Tx antenna (Tx. ANT 1) 106 to a fourth Tx antenna (Tx. ANT 4) 112.

When information/data bits are input, the modulator 100 generates modulated symbols by modulating the input information/data bits according to a modulation scheme and then outputs the modulated symbols to the S/P converter 102. The modulation scheme can use, for example, any one of binary phase shift keying (BPSK), quadrature phase shift keying (QPSK), quadrature amplitude modulation (QAM), pulse amplitude modulation (PAM), phase shift keying (PSK), and the like.

The S/P converter 102 receives and parallel converts the modulated symbols serially output from the modulator 100 and then outputs the parallel converted modulated symbols to the space-time block encoder 104. It is assumed that the modulated symbols serially output from the modulator 100 are $s_1$, $s_2$, $s_3$ and $s_4$. Using an STBC process, the space-time block encoder 104 encodes the four modulated symbols, that is, $s_1$, $s_2$, $s_3$ and $s_4$, input from the S/P converter 102 and then outputs the following encoded modulated symbols.

$$G_4 = \begin{bmatrix} s_1 & s_2 & s_3 & s_4 \\ -s_2 & s_1 & -s_4 & s_3 \\ -s_3 & s_4 & s_1 & -s_2 \\ -s_4 & -s_3 & s_2 & s_1 \\ s_1^* & s_2^* & s_3^* & s_4^* \\ -s_2^* & s_1^* & -s_4^* & s_3^* \\ -s_3^* & s_4^* & s_1^* & -s_2^* \\ -s_4^* & -s_3^* & s_2^* & s_1^* \end{bmatrix}$$

$G_4$ denotes a coding matrix of symbols to be transmitted via the four Tx antennas 106 to 112. In the coding matrix, elements of each row are mapped to the Tx antennas and elements of each column are mapped to the Tx antennas in the associated time intervals.

In the first time interval, $s_1$, $s_2$, $s_3$ and $s_4$ are transmitted via the first, second, third and fourth Tx antennas 106, 108, 110 and 112, respectively. In the eighth time interval, $-s^*_4$, $-s^*_3$, $s^*_2$ and $s^*_1$ are transmitted via the first, second, third and fourth Tx antennas 106, 108, 110 and 112, respectively.

As described above, the space-time block encoder 104 controls the input modulated symbols to be transmitted via the four Tx antennas for the eight time intervals by applying negative and conjugate operations to the input modulated symbols. Since the symbols transmitted via the four Tx antennas are mutually orthogonal, a diversity gain equal to the diversity order may be achieved.

The structure of the signal transmitter of the MIMO mobile communication system using the STBC and the four Tx antennas proposed by Vahid Tarokh has been described with reference to FIG. 1.

Figure 2:
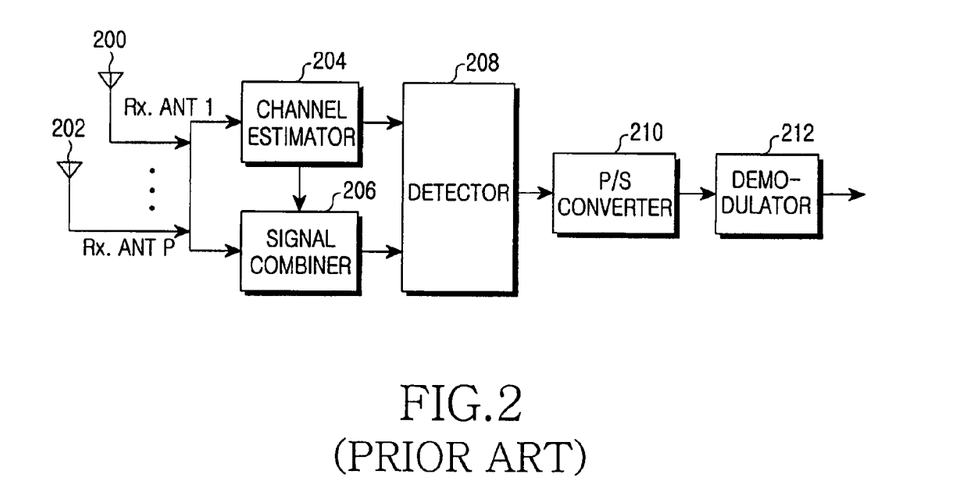
FIG. 2 illustrates a structure of a signal receiver mapped to the structure of the signal transmitter of FIG. 1.

FIG. 2 illustrates the structure of the signal receiver mapped to the structure of the signal transmitter of FIG. 1.

Referring to FIG. 2, the signal receiver is provided with multiple antennas, for example, P number of Rx antennas, that is, a first Rx antenna (Rx. ANT 1) 200 to a P-th Rx antenna (Rx. ANT P) 202, a channel estimator 204, a signal combiner 206, a detector 208, a parallel-to-serial (P/S) converter 210, and a demodulator 212. In FIG. 2, it is assumed that the number of Tx antennas of the signal transmitter mapped to the signal receiver is different from that of Rx antennas of the signal receiver. Alternatively, the number of Tx antennas of the signal transmitter can be the same as that of Rx antennas of the signal receiver.

First, the first Rx antenna 200 to the P-th Rx antenna 202 receive signals transmitted via the four Tx antennas from the signal transmitter as described with reference to FIG. 1. The signals received by the first Rx antenna 200 to the P-th Rx antenna 202 are output to the channel estimator 204 and the signal combiner 206.

The channel estimator 204 estimates channel coefficients representing channel gains and outputs the channel coefficients to the detector 208 and the signal combiner 206. The signal combiner 206 combines the signals received via the first Rx antenna 200 to the P-th Rx antenna 202 with the channel coefficients output from the channel estimator 204, and outputs received symbols to the detector 208.

The detector 208 generates hypothesis symbols by multiplying the received symbols output from the signal combiner 206 by the channel coefficients output from the channel estimator 204, computes decision statistics for all possible symbols transmitted from the signal transmitter using the hypothesis symbols, detects modulated symbols transmitted from the signal transmitter through threshold detection, and outputs the modulated symbols to the P/S converter 210.

The P/S converter 210 receives and serially converts the modulated symbols parallel output from the detector 208 and outputs the serially converted modulated symbols to the demodulator 212. The demodulator 212 receives the serially converted modulated symbols output from the P/S converter 210 and recovers the original information bits by demodulating the symbols in a demodulation scheme mapped to a modulation scheme applied to the modulator 100 of the signal transmitter.

As described above, the S. M. Alamouti proposed STBC scheme is advantageous in that a diversity order equal to the product of the number of Tx antennas and the Rx antennas, that is, full diversity order, may be achieved without degrading a data rate even when the signal transmitter transmits complex symbols via two Tx antennas.

In the structures of the signal transmitter and receiver of FIGS. 1 and 2 based on the Vahid Tarokh scheme extended from S. M. Alamouti proposed STBC scheme, the full diversity order may be achieved using space-time block codes in the form of a matrix with orthogonal columns. However, there is a problem in that a data rate may be reduced to ½ since four complex symbols are transmitted for eight time intervals. In addition, there is a problem in that reception performance may be degraded in a fast fading channel environment since eight time intervals are required to transmit one signal block, that is, four symbols.

When signals are transmitted via four or more Tx antennas in the STBC scheme as described above, (2×N) number of time intervals are required to transmit N symbols. In this case, there are problems in that latency may be lengthened and a data rate may be degraded. That is, when the STBC scheme is used, it is impossible to achieve full diversity and full rate (FDFR).

SUMMARY OF THE INVENTION

An aspect of the present invention is to address at least the above problems and/or disadvantages and to provide at least the advantages described below. Accordingly, an aspect of the present invention is to provide an apparatus and method for transmitting/receiving a signal at a full diversity gain and a full data rate in a mobile communication system using a multiple-input multiple-output (MIMO) scheme.

A further aspect of the present invention is to provide an apparatus and method for transmitting/receiving a signal that can reduce decoding complexity in a MIMO mobile communication system.

Another aspect of the present invention is to provide an apparatus and method for transmitting/receiving a signal that can reduce a peak to average power ratio (PAPR) in a MIMO mobile communication system.

In accordance with an aspect of the present invention, there is provided a signal transmitter for use in a communication system, that includes: a first pre-encoder for generating an upper pre-encoding symbol stream by pre-encoding an input upper transmission vector according to a pre-encoding scheme; a second pre-encoder for generating a lower pre-encoding symbol stream by pre-encoding an input lower transmission vector according to the pre-encoding scheme; and a space-time mapper for generating a space-time mapping matrix by space-time mapping the upper and lower pre-encoding symbol streams according to a space-time mapping scheme based on the number of transmit antennas to be used in the signal transmitter, and controlling a codeword to be generated and transmitted according to whether a null transmission is present in the space-time mapping matrix.

In accordance with another aspect of the present invention, there is provided a signal receiver for use in a communication system, that includes a channel estimator for estimating a channel response by channel estimating a received symbol stream; a signal combiner for dividing and generating an upper reception symbol vector and a lower reception symbol vector by combining signals of the received symbol stream with the channel response; a first maximum likelihood (ML) detector for detecting an estimated upper transmission vector by ML decoding the upper reception symbol vector; and a second ML detector for detecting an estimated lower transmission vector by ML decoding the lower reception symbol vector.

In accordance with a further aspect of the present invention, there is provided a method for transmitting a signal in a signal transmitter of a communication system, that includes: generating an upper pre-encoding symbol stream and a lower pre-encoding symbol stream by pre-encoding an upper transmission vector and a lower transmission vector according to a pre-encoding scheme; generating a space-time mapping matrix by space-time mapping the upper and lower pre-encoding symbol streams according to a space-time mapping scheme based on the number of transmit antennas to be used in the signal transmitter; and generating and transmitting a codeword according to whether a null transmission is present in the space-time mapping matrix.

In accordance with a still further aspect of the present invention, there is provided a method for receiving a signal in a signal receiver of a communication system, that includes: estimating a channel response by channel estimating a received symbol stream; dividing and generating an upper reception symbol vector and a lower reception symbol vector by combining signals of the received symbol stream with the channel response; and detecting an estimated upper transmission vector and an estimated lower transmission vector by ML decoding the upper and lower reception symbol vectors.

BRIEF DESCRIPTION OF THE DRAWINGS

The above and other features and advantages of the present invention will be more apparent from the following detailed description taken in conjunction with the accompanying drawings, in which.

DETAILED DESCRIPTION OF EXEMPLARY EMBODIMENTS

Exemplary embodiments of the present invention will be described in detail herein below with reference to the accompanying drawings. The matters defined in the description such as a detailed construction and elements are provided to assist in a comprehensive understanding of exemplary embodiments of the invention. Descriptions of well-known functions and constructions are omitted for clarity and conciseness.

Exemplary embodiments of the present invention provide an apparatus and method for transmitting/receiving a signal at a full diversity gain and a full data rate, that is, full diversity and full rate (FDFR), in a mobile communication system using a multiple-input multiple-output (MIMO) scheme. Moreover, exemplary embodiments of the present invention provide an apparatus and method for transmitting/receiving a signal that can reduce decoding complexity and a peak to average power ratio (PAPR) in a MIMO mobile communication system.

Figure 3:
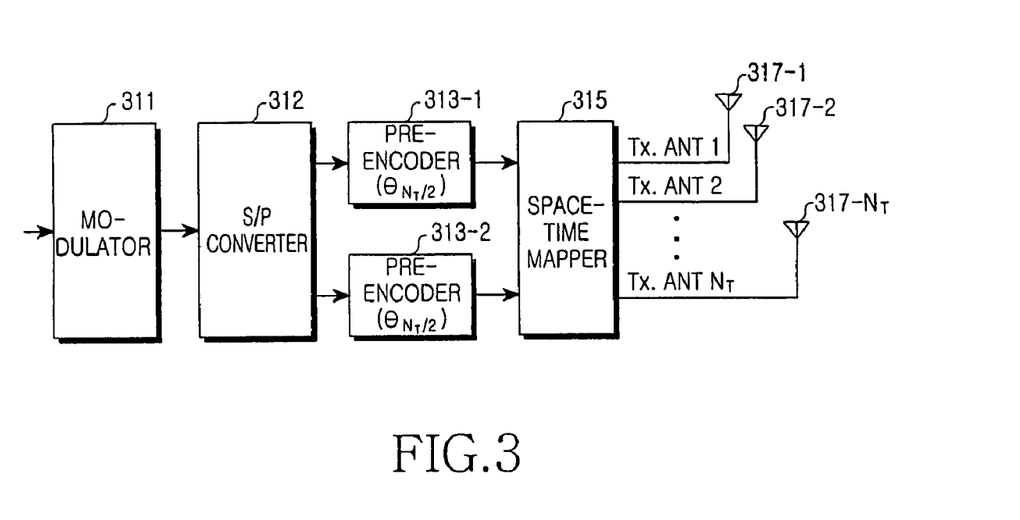
FIG. 3 illustrates a structure of a signal transmitter of a MIMO mobile communication system in accordance with the present invention.

FIG. 3 illustrates a structure of a signal transmitter of a MIMO mobile communication system in accordance with an exemplary embodiment of the present invention.

Referring to FIG. 3, the signal transmitter can include a modulator 311, a serial-to-parallel (S/P) converter 312, two pre-encoders 313-1 and 313-2, a space-time mapper 315, and multiple antennas, for example, $N_T$ number of transmit (Tx) antennas, that is, a Tx antenna (Tx. ANT 1) 317-1 to a Tx antenna (Tx. ANT $N_T$) 317-$N_T$.

When information/data bits are input, the modulator 311 modulates the input information/data bits according to a predefined modulation scheme, generates modulated symbols, that is, a modulated symbol stream, and outputs the modulated symbol stream to the S/P converter 312. The S/P converter 312 parallel converts the modulated symbol stream, and generates a first modulated symbol stream and a second modulated symbol stream. The S/P converter 312 outputs the first modulated symbol stream to the pre-encoder 313-1 and also outputs the second modulated symbol stream to the pre-encoder 313-2. Herein, the modulation scheme can use, for example, any one of binary phase shift keying (BPSK), quadrature phase shift keying (QPSK), quadrature amplitude modulation (QAM), pulse amplitude modulation (PAM), phase shift keying (PSK), and the like. The modulated symbol stream output from the modulator 311 is denoted by $x=[x_1, x_2, \ldots, x_{N_T}]^T$. The first and second modulated symbol streams are denoted by $x_u=[x_1, \ldots, x_{N_T/2}]^T$ and $x_l=[x_{N_T/2}, \ldots, x_{N_T}]^T$, respectively. The first modulated symbol stream $x_u=[x_1, \ldots, x_{N_T/2}]^T$ is referred to as an upper transmission vector and the second modulated symbol stream $x_l=[x_{N_T/2+1}, \ldots, x_{N_T}]^T$ is referred to as a lower transmission vector.

The pre-encoder 313-1 receives the first modulated symbol stream $x_u=[x_1, \ldots, x_{N_T/2}]^T$ output from the S/P converter 312, pre-encodes the first modulated symbol stream in a pre-defined pre-encoding scheme, generates pre-encoded symbols, that is, an upper pre-encoding symbol stream, and outputs the upper pre-encoding symbol stream to the space-time mapper 315. The pre-encoder 313-2 receives the second modulated symbol stream $x_l=[x_{N_T/2+1}, \ldots, x_{N_T}]^T$ output from the S/P converter 312, pre-encodes the second modulated symbol stream in the pre-encoding scheme, generates pre-encoded symbols, that is, a lower pre-encoding symbol stream, and outputs the lower pre-encoding symbol stream to the space-time mapper 315. Herein, the pre-encoding scheme is based on a pre-encoding matrix as shown in Equation (1).

$$\Theta_{N_T/2} = \frac{1}{\sqrt{N_T/2}} \begin{bmatrix} 1 & \alpha_1 & \cdots & \alpha_1^{N_T/2-1} \\ 1 & \alpha_2 & \cdots & \alpha_2^{N_T/2-1} \\ \vdots & \vdots & \ddots & \vdots \\ 1 & \alpha_{N_T/2} & \cdots & \alpha_{N_T/2}^{N_T/2-1} \end{bmatrix} = \begin{bmatrix} \theta_1^T \\ \theta_2^T \\ \vdots \\ \theta_{N_T/2}^T \end{bmatrix} \quad (1)$$

In Equation (1), $\Theta_{N_T/2}$ denotes the pre-encoding matrix and $\alpha_i = \exp(j2\pi(i-\frac{3}{4})/N_T)$. The upper pre-encoding symbol stream is denoted by $$s_u = [s_{u_1}, \cdots, s_{u_{N_T/2}}]^T = [\theta_1^T x_u, \cdots, \theta_{N_T/2}^T x_u]^T$$

and the lower pre-encoding symbol stream is denoted by $$s_l = [s_{l_1}, \cdots, s_{l_{N_T/2}}]^T = [\theta_1^T x_l, \cdots, \theta_{N_T/2}^T x_l]^T.$$

The upper pre-encoding symbol stream $$s_u = [s_{u_1}, \cdots, s_{u_{N_T/2}}]^T = [\theta_1^T x_u, \cdots, \theta_{N_T/2}^T x_u]^T$$

includes the upper transmission vector and the lower pre-encoding symbol stream $$s_l = [s_{l_1}, \cdots, s_{l_{N_T/2}}]^T = [\theta_1^T x_l, \cdots, \theta_{N_T/2}^T x_l]^T$$

includes the lower transmission vector.

The space-time mapper 315 receives the upper pre-encoding symbol stream $$s_u = [s_{u_1}, \cdots, s_{u_{N_T/2}}]^T = [\theta_1^T x_u, \cdots, \theta_{N_T/2}^T x_u]^T$$

and the lower pre-encoding symbol stream $$s_l = [s_{l_1}, \cdots, s_{l_{N_T/2}}]^T = [\theta_1^T x_l, \cdots, \theta_{N_T/2}^T x_l]^T$$

and performs a space-time mapping process in a scheme in which the upper and lower pre-encoding symbol streams are mixed and quasi-orthogonal in a unit of four elements. The quasi-orthogonal scheme space-time maps the upper pre-encoding symbol stream $$s_u = [s_{u_1}, \cdots, s_{u_{N_T/2}}]^T = [\theta_1^T x_u, \cdots, \theta_{N_T/2}^T x_u]^T$$

and the lower pre-encoding symbol stream $$s_l = [s_{l_1}, \cdots, s_{l_{N_T/2}}]^T = [\theta_1^T x_l, \cdots, \theta_{N_T/2}^T x_l]^T$$

as shown in Equation (2).

tics in which the first and third rows are orthogonal and the second and fourth rows are orthogonal.

The space-time mapper 315 uses a unitary matrix according to whether a null transmission is present in the space-time mapping matrix. An example in which the identity matrix I is used as the unitary matrix U has been described when no null transmission is present in the space-time mapping matrix $S_{Q\text{-}HLCP}$. Alternatively, the Hadamard unitary matrix can be used when no null transmission is present in the space-time mapping matrix $S_{Q\text{-}HLCP}$.

When $N_T \geq 8$, the space-time mapper 315 generates a target codeword $C_{Q\text{-}HLCP}$ by multiplying the space-time mapping matrix $S_{Q\text{-}HLCP}$ by the Hadamard unitary matrix HU. When $N_T=4$, the space-time mapper 315 generates a target codeword $C_{Q\text{-}HLCP}$ by multiplying the space-time mapping matrix $S_{Q\text{-}HLCP}$ by the identity matrix I. When the null transmission is present in the space-time mapping matrix $S_{Q\text{-}HLCP}$, the reason why the Hadamard unitary matrix HU is multiplied is that the Hadamard unitary matrix HU can effectively reduce a PAPR without affecting codeword performance characteristics, for example, the diversity, coding gain, kissing number, product distance distribution, and the like. That is, the unitary matrix U does not affect performance in a linear amplifier by $$S_{Q-HLCP} = \begin{bmatrix} S_Q(s_{u_1}, s_{u_{N_T/4+1}}, s_{l_1}, s_{l_{N_T/4+1}}) & 0 & \cdots & 0 \\ 0 & S_Q(s_{u_2}, s_{u_{N_T/4+2}}, s_{l_2}, s_{l_{N_T/4+2}}) & \cdots & 0 \\ \vdots & \vdots & \ddots & \vdots \\ 0 & 0 & \cdots & S_Q(s_{u_{N_T/4}}, s_{u_{N_T/2}}, s_{l_{N_T/4}}, s_{l_{N_T/2}}) \end{bmatrix} \quad (2)$$

In Equation (2), $S_{Q\text{-}HLCP}$ denotes a matrix space-time mapped in the quasi-orthogonal scheme. $S_Q(s_{u_1}, s_{u_2}, s_{l_1}, s_{l_2})$ can be defined as shown in Equation (3). For convenience of explanation, the matrix space-time mapped in the quasi-orthogonal scheme is referred to as a space-time mapping matrix.

$$S_Q(s_{u_1}, s_{u_2}, s_{l_1}, s_{l_2}) = \frac{1}{2} \begin{bmatrix} s_{u_1} & s_{u_2} & s_{l_1} & s_{l_2} \\ s_{u_2} & -s_{u_1} & -s_{l_2} & s_{l_1} \\ -s_{l_1}^* & -s_{l_2}^* & s_{u_1}^* & s_{u_2}^* \\ s_{l_2}^* & -s_{l_1}^* & s_{u_2}^* & -s_{u_1}^* \end{bmatrix} \quad (3)$$

$$= \frac{1}{2} \begin{bmatrix} \theta_1^T x_u & \theta_2^T x_u & \theta_1^T x_l & \theta_2^T x_l \\ \theta_2^T x_u & -\theta_1^T x_u & -\theta_2^T x_l & \theta_1^T x_l \\ -(\theta_1^T x_l)^* & -(\theta_2^T x_l)^* & (\theta_1^T x_u)^* & (\theta_2^T x_u)^* \\ (\theta_2^T x_l)^* & -(\theta_1^T x_l)^* & (\theta_2^T x_u)^* & -(\theta_1^T x_u)^* \end{bmatrix}$$

As shown in Equations (3) and (4), it can be seen that the quasi-orthogonal scheme has quasi-orthogonal characterisreducing the PAPR, but improves performance in a nonlinear amplifier by significantly reducing non-linear distortion.

Assuming that the unitary matrix U is the identity matrix I, the codeword characteristic is as follows. That is, $C_{Q\text{-}HLCP}=S_{Q\text{-}HLCP}U=S_{Q\text{-}HLCP}$.

First, $C_Q(s_{u_1}, s_{u_2}, s_{l_1}, s_{l_2})$ has the following characteristic as shown in Equation (4) when the i-th column is expressed by $\Re_i$ where i=1,2,3,4.

$$<\Re_1, \Re_3> = <\Re_1, \Re_4> = <\Re_2, \Re_3> = <\Re_2, \Re_4> = 0 \quad (4)$$

In Equation (4), $<\Re_i, \Re_j>$ denotes an inner product of $\Re_i$ and $\Re_j$. Thus, a subspace generated by $\Re_1$ and $\Re_2$ is orthogonal to that generated by $\Re_3$ and $\Re_4$. An error matrix of the codeword $C_{Q\text{-}HLCP}$ is denoted by $E_{Q\text{-}HLCP}$ and a square matrix of the error matrix $E_{Q\text{-}HLCP}$ is denoted by $A_{Q\text{-}HLCP}$. When error matrices $e_u=x_u-\tilde{x}_u$ and $e_l=x_l-\tilde{x}_l$ are used, the error matrix $E_{Q\text{-}HLCP}$ and the square matrix $A_{Q\text{-}HLCP}$ of the error matrix $E_{Q\text{-}HLCP}$ can be expressed as shown in Equations (5) and (6), respectively.

$$E_{Q-HLCP} = \begin{bmatrix} E_Q(s_{u_1}, s_{u_{N_T/4+1}}, s_{l_1}, s_{l_{N_T/4+1}}) & 0 & \cdots & 0 \\ 0 & E_Q(s_{u_2}, s_{u_{N_T/4+2}}, s_{l_2}, s_{l_{N_T/4+2}}) & \cdots & 0 \\ \vdots & \vdots & \ddots & \vdots \\ 0 & 0 & \cdots & E_Q(s_{u_{N_T/4}}, s_{u_{N_T/2}}, s_{l_{N_T/4}}, s_{l_{N_T/2}}) \end{bmatrix} \quad (5)$$

$$= \begin{bmatrix} A_Q(s_{u_1}, s_{u_{N_T/4+1}}, s_{l_1}, s_{l_{N_T/4+1}}) & 0 & \cdots & 0 \\ 0 & A_Q(s_{u_2}, s_{u_{N_T/4+2}}, s_{l_2}, s_{l_{N_T/4+2}}) & \cdots & 0 \\ \vdots & \vdots & \ddots & \vdots \\ 0 & 0 & \cdots & A_Q(s_{u_{N_T/4}}, s_{u_{N_T/2}}, s_{l_{N_T/4}}, s_{l_{N_T/2}}) \end{bmatrix} \quad (6)$$

$E_Q(s_{u_1}, s_{u_2}, s_{l_1}, s_{l_2})$ of Equation (5) is expressed as shown in Equation (7) and $A_Q(s_{u_1}, s_{u_2}, s_{l_1}, s_{l_2})$ of Equation (6) is expressed as shown in Equation (8).

$$E_Q(s_{u_1}, s_{u_2}, s_{l_1}, s_{l_2}) = \frac{1}{2} \begin{bmatrix} \theta_1^T e_u & \theta_2^T e_u & \theta_1^T e_l & \theta_2^T e_l \\ \theta_2^T e_u & -\theta_1^T e_u & -\theta_2^T e_l & \theta_1^T e_l \\ -(\theta_1^T e_l)^* & -(\theta_2^T e_l)^* & (\theta_1^T e_u)^* & (\theta_2^T e_u)^* \\ (\theta_2^T e_l)^* & -(\theta_1^T e_l)^* & (\theta_2^T e_u)^* & -(\theta_1^T e_u)^* \end{bmatrix} \quad (7)$$

$$A_Q(s_{u_1}, s_{u_2}, s_{l_1}, s_{l_2}) = E_Q(s_{u_1}, s_{u_2}, s_{l_1}, s_{l_2}) E_Q^H(s_{u_1}, s_{u_2}, s_{l_1}, s_{l_2}) \quad (8)$$

$$= \begin{bmatrix} a(s_{u_1}, s_{u_2}, s_{l_1}, s_{l_2}) & -b(s_{u_1}, s_{u_2}, s_{l_1}, s_{l_2}) & 0 & 0 \\ b(s_{u_1}, s_{u_2}, s_{l_1}, s_{l_2}) & a(s_{u_1}, s_{u_2}, s_{l_1}, s_{l_2}) & 0 & 0 \\ 0 & 0 & a(s_{u_1}, s_{u_2}, s_{l_1}, s_{l_2}) & b(s_{u_1}, s_{u_2}, s_{l_1}, s_{l_2}) \\ 0 & 0 & -b(s_{u_1}, s_{u_2}, s_{l_1}, s_{l_2}) & a(s_{u_1}, s_{u_2}, s_{l_1}, s_{l_2}) \end{bmatrix}$$

In Equation (8), $$a(s_{u_1}, s_{u_2}, s_{l_1}, s_{l_2}) = \frac{|\theta_1^T e_u|^2 + |\theta_2^T e_u|^2 + |\theta_1^T e_l|^2 + |\theta_2^T e_l|^2}{4} \text{ and}$$

$$a(s_{u_1}, s_{u_2}, s_{l_1}, s_{l_2}) = \frac{\theta_2^T e_u(\theta_1^T e_u)^* - \theta_1^T e_u(\theta_2^T e_u)^* + \theta_1^T e_l(\theta_2^T e_l)^* - \theta_2^T e_l(\theta_1^T e_l)^*}{4}.$$

Since an upper group and a lower group are separated from the square matrix $A_{Q\text{-}HLCP}$ of the error matrix $E_{Q\text{-}HLCP}$ as described above, the upper and lower groups can be independently considered. Maximum likelihood (ML) decoding complexity is further reduced in the codeword $C_{Q\text{-}HLCP}$ compared with the conventional codeword. That is, the codeword $C_{Q\text{-}HLCP}$ can be separated into the upper and lower groups as shown in Equation (9).

$$C_{Q\text{-}HCLP} = C_{Q\text{-}HCLP}(x_u) C_{Q\text{-}HCLP}^H(x_l) \quad (9)$$

$$= \frac{1}{2} \left\{ \begin{bmatrix} C_Q(s_{u_1}, s_{u_{N_T/4+1}}, 0, 0) & \cdots & 0 \\ 0 & \cdots & 0 \\ \vdots & \ddots & \vdots \\ 0 & \cdots & C_Q(s_{u_{N_T/4}}, s_{u_{N_T/2}}, 0, 0) \end{bmatrix} + \begin{bmatrix} C_Q(0, 0, s_{l_1}, s_{l_{N_T/4+1}}) & \cdots & 0 \\ 0 & \cdots & 0 \\ \vdots & \ddots & \vdots \\ 0 & \cdots & C_Q(0, 0, s_{l_{N_T/4}}, s_{l_{N_T/2}}) \end{bmatrix} \right\}$$

The codeword $C_{Q\text{-}HLCP}$ can have all advantages of the conventional codeword and can also reduce both the ML decoding complexity and the PAPR. Thus, it can be seen that performance is superior when the codeword $C_{Q\text{-}HLCP}$ is used in the MIMO mobile communication system with a nonlinear amplifier.

Figure 4:
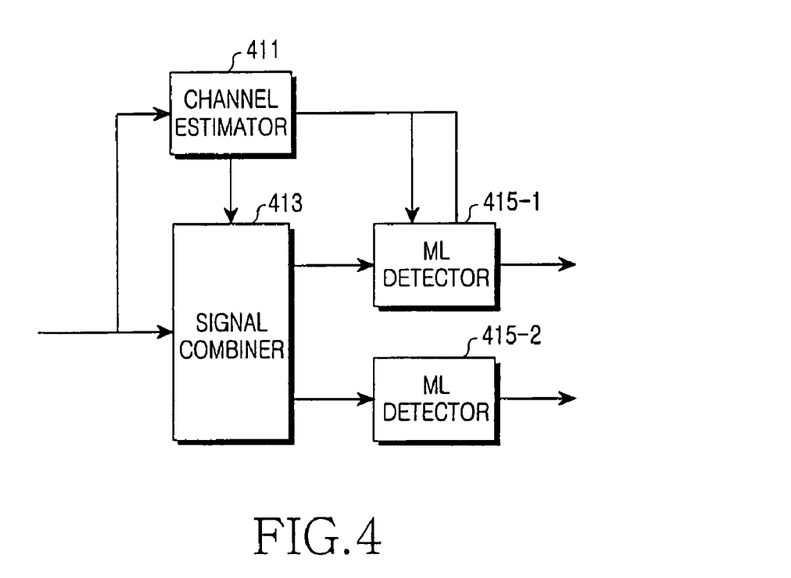
FIG. 4 illustrates a structure of a signal receiver mapped to the structure of the signal transmitter of FIG. 3.

FIG. 4 illustrates the structure of the signal receiver mapped to the structure of the signal transmitter of FIG. 3.

Referring to FIG. 4, the signal receiver can include multiple antennas, for example, $N_R$ number of receive (Rx) antennas (Rx. ANT 1 to Rx. ANT $N_R$) (not illustrated), a channel estimator 411, a signal combiner 413 and two ML detectors 415-1 and 415-2. Herein, the number $N_R$ of Rx antennas can be equal to or different from the number $N_T$ of Tx antennas of the signal transmitter of FIG. 3 mapped to the signal receiver.

First, signals transmitted via the $N_T$ Tx antennas from the signal transmitter as described with reference to FIG. 3 are received via the $N_R$ Rx antennas for an $N_T$ time. The signals received via the $N_R$ Rx antennas are output to the channel estimator 411 and the signal combiner 413. The signals received via the $N_R$ Rx antennas for the $N_T$ time are referred to as a received symbol stream. The received symbol stream is denoted by $r=[r_1, \ldots r_{N_T}]^T$.

The channel estimator 411 receives the received symbol stream $r=[r_1, \ldots, r_{N_T}]^T$, estimates a channel response h, and outputs the channel response h to the signal combiner 413 and the ML detectors 415-1 and 415-2. The signal combiner 413 combines signals using the received symbol stream $r=[r_1, \ldots r_{N_T}]^T$ and the channel response h, and generates an upper reception symbol vector and a lower reception symbol vector. The signal combiner 413 outputs the upper reception symbol vector to the ML detector 415-1 and outputs the lower reception symbol vector to the ML detector 415-2. The upper and lower reception symbol vectors are denoted by $$\tilde{s}_u = [\tilde{s}_{u_1}, \cdots, \tilde{s}_{u_{N_T/2}}]^T \text{ and } \tilde{s}_l = [\tilde{s}_{l_1}, \cdots, \tilde{s}_{l_{N_T/2}}]^T,$$

respectively, and the channel response is denoted by $h=[h_1, \ldots, h_{N_T}]^T$. It is assumed that the channel response $h=[h_1, \ldots h_{N_T}]^T$ is a block-fading model constant in an interval of one codeword. Consequently, the signal combiner 413 divides the received symbol stream $r=[r_1, \ldots, r_{N_T}]^T$ into the upper reception symbol vector $$\tilde{s}_u = [\tilde{s}_{u_1}, \cdots, \tilde{s}_{u_{N_T/2}}]^T$$

and the lower reception symbol vector $$\tilde{s}_l = [\tilde{s}_{l_1}, \cdots, \tilde{s}_{l_{N_T/2}}]^T.$$

The ML detector 415-1 detects an estimated upper transmission vector by receiving and ML decoding the upper reception symbol vector $$\tilde{s}_u = [\tilde{s}_{u_1}, \cdots, \tilde{s}_{u_{N_T/2}}]^T.$$

The ML detector 415-2 detects an estimated lower transmission vector by receiving and ML decoding the lower reception symbol vector $$\tilde{s}_l = [\tilde{s}_{l_1}, \cdots, \tilde{s}_{l_{N_T/2}}]^T.$$

Herein, the estimated upper transmission vector is denoted by $$\hat{x}_u = [\hat{x}_{u_1}, \cdots, \hat{x}_{u_{N_T/2}}]^T$$

and the estimated lower transmission vector is denoted by $$\hat{x}_l = [\hat{x}_{l_1}, \cdots, \hat{x}_{l_{N_T/2}}]^T.$$

Assuming that the number of Tx antennas, $N_T$, is 4 ($N_T=4$) and the number of Rx antennas, $N_R$, is 1 ($N_R=1$), an operation of the signal receiver is as follows.

First, it is assumed that elements constructing a symbol stream received in an interval of four symbols are expressed as shown in Equation (10).

$$r_1 = h_1 s_{u_1} + h_2 s_{u_2} - h_3 s_{l_1}^* + h_4 s_{l_2}^* + n_1 \quad (10)$$
$$r_2 = h_1 s_{u_2} - h_2 s_{u_1} - h_3 s_{l_2}^* - h_4 s_{l_1}^* + n_2$$
$$r_3 = h_1 s_{l_1} - h_2 s_{l_2} + h_3 s_{u_1}^* + h_4 s_{u_2}^* + n_3$$
$$r_4 = h_1 s_{l_1} + h_2 s_{l_2} + h_3 s_{u_2}^* - h_4 s_{u_1}^* + n_4$$

In Equation (10), $n=[n=n_1, \ldots n_4]^T$ and $n_i$ denotes noise occurred in the signal receiver at the i-th time.

As shown in Equation (11), the received symbol stream is divided into an upper reception symbol vector $\tilde{s}_u=[\tilde{s}_{u_1}, \tilde{s}_{u_2}]^T$ and a lower reception symbol vector $\tilde{s}_l=[\tilde{s}_{l_1}, \tilde{s}_{l_2}]^T$ by the signal combiner 413.

$$\tilde{s}_{u_1} = A s_{u_1} + B s_{u_2} + n'_1 = h^*_1 r_1 - h^*_2 r_2 + h^*_3 r_3 - h_4 r^*_4$$
$$\tilde{s}_{u_2} = A s_{u_2} - B s_{u_1} + n'_2 = h^*_2 r_1 + h^*_1 r_2 + h_4 r^*_3 + h_3 r^*_4$$
$$\tilde{s}_{l_1} = A s_{l_1} - B s_{l_2} + n'_3 = -h_3 r^*_1 - h_4 r^*_2 + h^*_1 r_3 + h^*_2 r_4$$
$$\tilde{s}_{l_2} = A s_{l_2} + B s_{l_1} + n'_4 = h_4 r^*_1 - h_3 r^*_2 - h^*_2 r_3 + h^*_1 r_4 \quad (11)$$

In Equation (11), $A=|h_1|^2+|h_2|^2+|h_3|^2+|h_4|^2$, $B=2\text{Im}(h_1 h^*_2+h_3 h^*_4)$, $n'_1=h^*_1 n_1-h^*_2 n_2+h_3 n^*_3-h_4 n^*_4$, $n'_2=h^*_2 n_1+h^*_1 n_2+h_4 n^*_3+h_3 n^*_4$, $n'_3=-h_3 n^*_1-h_4 n^*_2+h^*_1 n_3+h^*_2 n_4$, and $n'_4=h_4 n^*_1-h_3 n^*_2-h^*_2 n_3+h^*_1 n_4$.

When an independent ML decoding process is performed using the upper reception symbol vector $\tilde{s}_u$, an estimated upper transmission vector $\hat{x}_u=[\hat{x}_{u_1}, \hat{x}_{u_2}]^T$ can be detected. When an independent ML decoding process is performed using the lower reception symbol vector $\tilde{s}_l$, an estimated lower transmission vector $\hat{x}_l=[\hat{x}l_1, \hat{x}_{l_2}]^T$ can be detected.

As is apparent from the above description, the present invention can achieve a full diversity gain and a full data rate by providing a space-time mapping scheme using a quasi-orthogonal scheme in a MIMO mobile communication system. Moreover, the present invention can reduce ML decoding complexity and a PAPR by providing the space-time mapping scheme using the quasi-orthogonal scheme in the MIMO mobile communication system.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A method for transmitting a signal in a signal transmitter of a communication system, comprising:
   generating an upper pre-encoding symbol stream and a lower pre-encoding symbol stream by pre-encoding an upper transmission vector and a lower transmission vector according to a pre-encoding scheme;
   generating a space-time mapping matrix by space-time mapping the upper and lower pre-encoding symbol streams according to a space-time mapping scheme based on a number of transmit antennas to be used in the signal transmitter;
   generating a codeword by multiplying the space-time mapping matrix by a unitary matrix according to whether a null transmission is present in the space-time mapping matrix; and
   transmitting the codeword,
   wherein the unitary matrix is set to a Hadamard unitary matrix, when the null transmission is present in the space-time mapping matrix, and is set to an identity matrix, when the null transmission is not present in the space-time mapping matrix, wherein space-time mapping the upper and lower pre-encoding symbol streams according to the space-time mapping scheme comprises space-time mapping the upper and lower pre-encoding symbol streams using a quasi-orthogonal scheme such that the upper and lower transmission vectors are orthogonal in a unit of a predetermined number of vectors, and wherein an upper group element and a lower group element of the codeword are separated based on a square matrix of an error matrix about the codeword.

2. The method of claim 1, wherein pre-encoding the upper transmission vector and the lower transmission vector according to the pre-encoding scheme comprises:

pre-encoding the upper transmission vector and the lower transmission vector according to a pre-encoding matrix.

3. The method of claim 2, wherein the pre-encoding matrix is defined by:

$$\Theta_{N_T/2} = \frac{1}{\sqrt{N_T/2}} \begin{bmatrix} 1 & \alpha_1 & \cdots & \alpha_1^{N_T/2-1} \\ 1 & \alpha_2 & \cdots & \alpha_2^{N_T/2-1} \\ \vdots & \vdots & \ddots & \vdots \\ 1 & \alpha_{N_T/2} & \cdots & \alpha_{N_T/2}^{N_T/2-1} \end{bmatrix} = \begin{bmatrix} \theta_1^T \\ \theta_2^T \\ \vdots \\ \theta_{N_T/2}^T \end{bmatrix},$$

where $\Theta_{N_T/2}$ denotes the pre-encoding matrix, $N_T$ denotes the number of transmit antennas, and $\alpha_i = \exp(j2\pi(i-\frac{3}{4})/N_T)$.

4. The method of claim 1, wherein, when the upper transmission vector is $x_u = [x_1, \ldots, x_{N_T/2}]^T$, the lower transmission vector is $x_l = [x_{N_T/2+1}, \ldots, x_{N_T}]^T$, the upper pre-encoding symbol stream is $s_u = [s_{u_1}, \ldots, s_{u_{N_T/2}}]^T = [\theta_1^T x_u, \ldots, \theta_{N_T/2}^T x_u]^T$ and the lower pre-encoding symbol stream is $s_l = [s_{l_1}, \ldots, s_{l_{N_T/2}}]^T = [\theta_1^T x_l, \ldots, \theta_{N_T/2}^T x_l]^T$, the space-time mapping matrix is defined by:

$$S_{Q-HLCP} = \begin{bmatrix} S_Q(s_{u_1}, s_{u_{N_T/4+1}}, s_{l_1}, s_{l_{N_T/4+1}}) & 0 & \cdots & 0 \\ 0 & S_Q(s_{u_2}, s_{u_{N_T/4+2}}, s_{l_2}, s_{l_{N_T/4+2}}) & \cdots & 0 \\ \vdots & \vdots & \ddots & \vdots \\ 0 & 0 & \cdots & S_Q(s_{u_{N_T/4}}, s_{u_{N_T/2}}, s_{l_{N_T/4}}, s_{l_{N_T/2}}) \end{bmatrix},$$

where $S_{Q-HLCP}$ denotes the space-time mapping matrix and $S_Q(s_{u_1}, s_{u_2}, s_{l_1}, s_{l_2})$ is defined by:

$$S_Q(s_{u_1}, s_{u_2}, s_{l_1}, s_{l_2}) = \frac{1}{2} \begin{bmatrix} s_{u_1} & s_{u_2} & s_{l_1} & s_{l_2} \\ s_{u_2} & -s_{u_1} & -s_{l_2} & s_{l_1} \\ -s_{l_1}^* & -s_{l_2}^* & s_{u_1}^* & s_{u_2}^* \\ s_{l_2}^* & -s_{l_1}^* & s_{u_2}^* & -s_{u_1}^* \end{bmatrix}$$

$$= \frac{1}{2} \begin{bmatrix} \theta_1^T x_u & \theta_2^T x_u & \theta_1^T x_l & \theta_2^T x_l \\ \theta_2^T x_u & -\theta_1^T x_u & -\theta_2^T x_l & \theta_1^T x_l \\ -(\theta_1^T x_l)^* & -(\theta_2^T x_l)^* & (\theta_1^T x_u)^* & (\theta_2^T x_u)^* \\ (\theta_2^T x_l)^* & -(\theta_1^T x_l)^* & (\theta_2^T x_u)^* & -(\theta_1^T x_u)^* \end{bmatrix}.$$

5. A signal transmitter for use in a communication system, comprising:

a first pre-encoder for generating an upper pre-encoding symbol stream by pre-encoding an input upper transmission vector according to a pre-encoding scheme;

a second pre-encoder for generating a lower pre-encoding symbol stream by pre-encoding an input lower transmission vector according to the pre-encoding scheme; and a space-time mapper for generating a space-time mapping matrix by space-time mapping the upper and lower pre-encoding symbol streams according to a space-time mapping scheme based on a number of transmit antennas to be used in the signal transmitter, generating a codeword by multiplying the space-time mapping matrix by a unitary matrix according to whether a null transmission is present in the space-time mapping matrix, and transmitting the codeword, wherein the unitary matrix is set to a Hadamard unitary matrix, when the null transmission is present in the space-time mapping matrix, and is set to an identity matrix, when the null transmission is not present in the space-time mapping matrix, wherein the space-time mapper performs space-time mapping of the upper and lower pre-encoding symbol streams using a quasi-orthogonal scheme such that the upper and lower transmission vectors are orthogonal in a unit of a predetermined number of vectors, and wherein an upper group element and a lower group element of the codeword are separated based on a square matrix of an error matrix about the codeword.

6. The signal transmitter of claim 5, wherein the first pre-encoder generates the upper pre-encoding symbol stream by pre-encoding the upper transmission vector according to a pre-encoding matrix, and the second pre-encoder generates the lower pre-encoding symbol stream by pre-encoding the lower transmission vector according to the pre-encoding matrix.

7. The signal transmitter of claim 6, wherein the pre-encoding matrix is defined by:

$$\Theta_{N_T/2} = \frac{1}{\sqrt{N_T/2}} \begin{bmatrix} 1 & \alpha_1 & \cdots & \alpha_1^{N_T/2-1} \\ 1 & \alpha_2 & \cdots & \alpha_2^{N_T/2-1} \\ \vdots & \vdots & \ddots & \vdots \\ 1 & \alpha_{N_T/2} & \cdots & \alpha_{N_T/2}^{N_T/2-1} \end{bmatrix} = \begin{bmatrix} \theta_1^T \\ \theta_2^T \\ \vdots \\ \theta_{N_T/2}^T \end{bmatrix},$$

where $\Theta_{N_T/2}$ denotes the pre-encoding matrix, $N_T$ denotes the number of transmit antennas, and $\alpha_i = \exp(j2\pi(i-\frac{3}{4})/N_T)$.

8. The signal transmitter of claim 5, wherein when the upper transmission vector is $x_u = [x_1, \ldots, x_{N_T/2}]^T$, the lower transmission vector is $x_l = [x_{N_T/2+1}, \ldots, x_{N_T}]^T$, the upper pre-encoding symbol stream is $s_u = [s_{u_1}, \ldots, s_{u_{N_T/2}}]^T = [\theta_1^T x_u, \ldots, \theta_{N_T/2}^T x_u]^T$ and the lower pre-encoding symbol stream is $s_1=[s_{l_1}, \ldots, s_{1_{N_T/2}}]^T=[\theta_1^T x_l, \ldots, \theta_{N_T/2}^T x_l]^T$, the space-time mapping matrix is defined by:

$$S_{Q-HLCP} = \begin{bmatrix} S_Q(s_{u_1}, s_{u_{N_T/4+1}}, s_{l_1}, s_{l_{N_T/4+1}}) & 0 & \cdots & 0 \\ 0 & S_Q(s_{u_2}, s_{u_{N_T/4+2}}, s_{l_2}, s_{l_{N_T/4+2}}) & \cdots & 0 \\ \vdots & \vdots & \ddots & \vdots \\ 0 & 0 & \cdots & S_Q(s_{u_{N_T/4}}, s_{u_{N_T/2}}, s_{l_{N_T/4}}, s_{l_{N_T/2}}) \end{bmatrix},$$

where $S_{Q-HLCP}$ denotes the space-time mapping matrix and $S_Q(s_{u_1}, s_{u_2}, s_{l_1}, s_{l_2})$ is defined by:

$$S_Q(s_{u_1}, s_{u_2}, s_{l_1}, s_{l_2}) = \frac{1}{2}\begin{bmatrix} s_{u_1} & s_{u_2} & s_{l_1} & s_{l_2} \\ s_{u_2} & -s_{u_1} & -s_{l_2} & s_{l_1} \\ -s_{l_1}^* & -s_{l_2}^* & s_{u_1}^* & s_{u_2}^* \\ s_{l_2}^* & -s_{l_1}^* & s_{u_2}^* & -s_{u_1}^* \end{bmatrix}$$

-continued $$= \frac{1}{2}\begin{bmatrix} \theta_1^T x_u & \theta_2^T x_u & \theta_1^T x_l & \theta_2^T x_l \\ \theta_2^T x_u & -\theta_1^T x_u & -\theta_2^T x_l & \theta_1^T x_l \\ -(\theta_1^T x_l)^* & -(\theta_2^T x_l)^* & (\theta_1^T x_u)^* & (\theta_2^T x_u)^* \\ (\theta_2^T x_l)^* & -(\theta_1^T x_l)^* & (\theta_2^T x_u)^* & -(\theta_1^T x_u)^* \end{bmatrix}.$$

* * * * *